United States Patent
McCoy

(10) Patent No.: US 7,266,377 B2
(45) Date of Patent: Sep. 4, 2007

(54) SYSTEM AND METHOD FOR VERIFYING AND MEASURING TRAFFIC

(76) Inventor: Robert E. McCoy, 8209 Chestnut Hill Ct., West Chester, OH (US) 45069

( * ) Notice: Subject to any disclaimer, the term of this patent is extended or adjusted under 35 U.S.C. 154(b) by 934 days.

(21) Appl. No.: 10/074,400

(22) Filed: Feb. 12, 2002

(65) Prior Publication Data

US 2002/0111136 A1   Aug. 15, 2002

(51) Int. Cl.
*H04Q 7/20* (2006.01)

(52) U.S. Cl. ............ 455/456.1; 455/454; 455/412.1; 370/535

(58) Field of Classification Search ........... 455/12.1, 455/427, 13.1, 456.1, 556.2, 454, 414.4, 455/412; 705/14, 10, 26, 28; 370/535, 412, 370/232; 709/203

See application file for complete search history.

(56) References Cited

U.S. PATENT DOCUMENTS

| | | | |
|---|---|---|---|
| 6,772,193 B1 * | 8/2004 | Igawa et al. ............... | 709/203 |
| 2003/0014312 A1 * | 1/2003 | Fleisher ...................... | 705/14 |
| 2003/0023511 A1 * | 1/2003 | Gardner, Sr. ............... | 705/27 |
| 2003/0056208 A1 * | 3/2003 | Kamada et al. ............. | 725/9 |

* cited by examiner

*Primary Examiner*—Matthew Anderson
*Assistant Examiner*—Tan Trinh
(74) *Attorney, Agent, or Firm*—Philip M. Weiss; Weiss & Weiss

(57) ABSTRACT

A system and method for capturing and verifying convergence traffic driven to the web via non-web technologies, i.e., radio, television, billboards and printed material.

3 Claims, 2 Drawing Sheets

SYSTEM AND METHOD FOR VERIFYING AND MEASURING TRAFFIC

FIELD OF THE INVENTION

The present invention relates to a system and method for capturing and verifying convergence traffic driven to the web via non-web technologies, i.e., radio, television, billboards and printed material.

BACKGROUND OF THE INVENTION

There is no present means of capturing or verifying convergence traffic driven to the web via non-web technologies i.e. radio, television and printed material. Television has Nielsen and Radio has Arbitron, but there is no device for measuring traffic from non-web technologies to the web.

SUMMARY OF THE INVENTION

The present invention relates to a system and method for capturing and/or verifying convergence traffic driven to the web via non-web technologies, i.e., radio, television and printed material.

The present invention relates to a system for capturing and/or verifying convergence traffic driven to a web via non-web technologies comprising; a transmitter source that has a sub carrier that is an identifier for a media source and all related advertisements; and a receiving interface device which captures the media source that is actively being consumed by an occupant tuned to the source.

The transmitter source can be a satellite or antennae, which has a sub carrier signal that identifies the media source and all related advertisements.

The present invention relates to a method for capturing and/or verifying convergence traffic driven to a web via non-web technologies comprising; placing a side band signal or digital tag or watermark signal to each piece of content. The programming is transmitted without any modification to the digital tags. The digital tags are collected and reported to a third party verification Internet collection point where it can be monitored by interested parties.

The present invention relates to a system for capturing and/or verifying convergence traffic driven to a web via non-web technologies. The system comprises a device for placing a side band signal or digital tag or watermark signal to each piece of content. The system further comprises a transmitting source, which also has a collecting device for collecting said digital tags. The transmitting source transmits programming without any modification to the digital tag. The digital tags are collected and reported to a third party verification Internet collection point where it can be monitored by interested parties.

It is an object of the present invention to verify that an advertisement or a program has been run on television or radio (outside of manual affidavits generated by the station managers). It is an object of the present invention to provide an interface with CDMT Software to trigger a "watch" for both the impact and behavior the event has on Internet site traffic. It is an object of the present invention to allow audience participation in programming, voting, etc. It is an object of the present invention to allow a user to respond to an advertisement. For example, it is an object of the invention to provide an auto launch to an ad web site or auto order "more information" with the push of a button or a touch screen. It is an object of the present invention to provide tracking of individuals habits of media interface.

It is an object the present invention to provide a transmitter source that has a sub carrier that is the identifier for the media source and all related advertisements. This is the media source saying, "This is who I am and what I am asking you to do" it could be an identifier for a program or a command to go to a website, etc.

The receiving interface device captures the media source that is actively being consumed by the occupant (tuned to) of the source. This is the receiving site saying "This is what I am tuned to while my device (radio, TV. etc.) is on and operating.

DETAILED DESCRIPTION OF PREFERRED EMBODIMENTS

Figure 1:
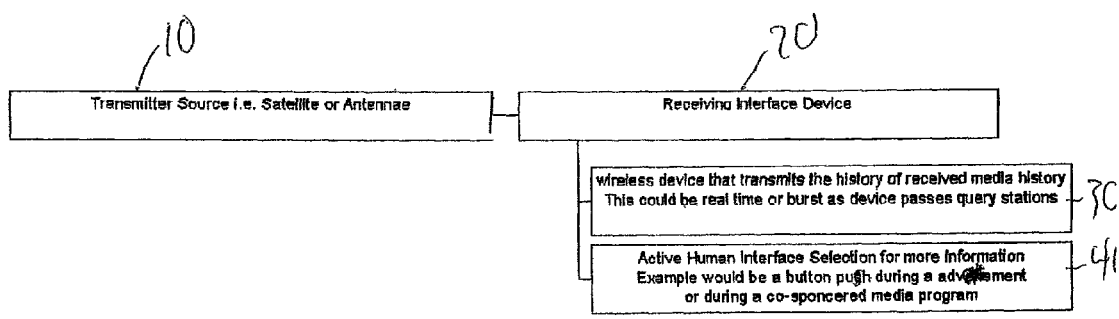
FIG. 1 illustrates a system for capturing and verifying convergence traffic driven to the web.

FIG. 1 illustrates an embodiment of the present invention. A transmitter source i.e., a satellite or antennae, has a sub carrier signal that identifies the media source and all related advertisements. This is the media source saying, "This is who I am and what I am asking you to do". It could be an identifier for a program or a command to go to a web site.

The receiving interface 20 captures the media source that is being actively consumed by the occupant (tuned to) the source. This is the receiving site saying, "This is what I am tuned to while my device (radio, TV) is on and operating. The system is very much like a transponder or ARINC system. Wireless device 30 transmits the history of received media history. This could be real time or burst as the device passes query stations. Active Human Interface Selection 40 provides more information. An example is a push button during an advertisement or during a co-sponsored media program.

The receiving Internet web site receives a "word" or stream of data from the media transmission systems that says "This is who I am (identification or cookie) this is what kind of device I am transmitting from (Radio Station, Satellite or in the case of the media receiver a Car, Palm, Computer Desk-Top, Home Media Receiver, etc.). And this is the media that was utilized or transmitted as well as the advertisements that had been presented. Additionally this interface actively queries these advertisements and stores them for future viewing or performs a real-time query.

Some examples of system configurations;
 a. A device acting as a bridge between the transmitted media signal and an Internet connected device such as a computer.
 b. Automobiles having wireless Internet connectivity.
 c. Televisions and Radios have these devices incorporated in them.
 d. Wireless Telephone/Radio/television systems.

Figure 2:
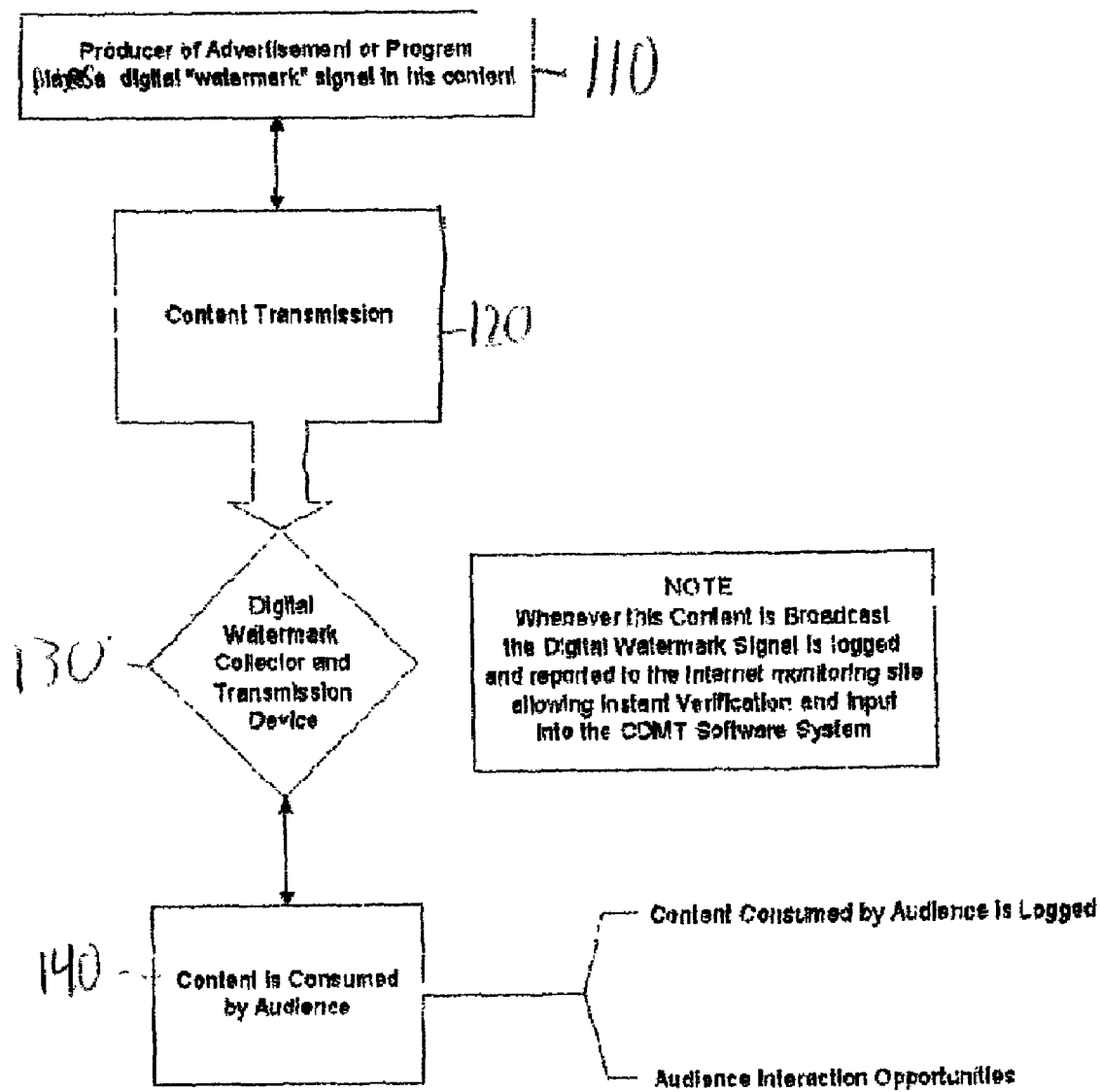
FIG. 2 illustrates a system for capturing and verifying convergence traffic driven to the web.

FIG. 2 illustrates a system for television and radio. The producer of a radio or television program or advertisement places a side band signal or digital tag or "watermark" signal 110 to each piece of content 120. The transmitting source 130, i.e., radio or television, which also has a collecting device for collecting the Digital Watermarks 110, transmits the programming without any modification to the digital tag. The digital tags 110 are collected and reported to a third party verification Internet collection point where it can be monitored by interested parties via subscription. The Content 120 is consumed by the audience 140. Whatever the Content 120 that is broadcast, the digital watermark signal 110 is logged and reported to the Internet monitoring site, allowing instant verification and input into the CDMT software system. Also the Content 120 that is sent to the audience 140 can provide opportunities to interact with the audience 140.

In a preferred embodiment, attached to this receiving device are two systems or capabilities.

a. A process that captures and stores the "history" of media interaction. Further this system transmits either via real-time or triggered data burst that history back to the Internet source of the media transmission allowing an understanding of audience size and behavior.

b. A media user interface such as a "button" that allows the media user to touch and be taken automatically to the item of query. An example would be that the user hears an advertisement for an "item" and with the touch of a button the user can have their Internet system automatically go to the source of the item on the Internet and either save it for future interaction or for real-time interaction.

Convergence is the movement of audience from non-measurable audiences (TV, radio and publications) to a measurable Internet audience.

On the Internet this information is gathered and placed in databases that are utilized to demonstrate the effectiveness of an ad campaign or the growth of a program audience. It is also able to show cyclic behavior of what technologies are favored at what times of the day. This type of information further allows those in the media to narrow in on audience behavior.

The invention claimed is:

1. A system for capturing and/or verifying convergence traffic driven to a web via non-web technologies comprising:
   a transmitter source that has a sub carrier that is an identifier for a media source and all related advertisements;
   a receiving interface device which captures said media source that is actively being consumed by an occupant tuned to said source;
   wherein said transmitter source is a satellite or antennae, which has a sub carrier signal that identifies said media source and all related advertisements.

2. A method for capturing and/or verifying convergence traffic driven to a web via non-web technologies comprising:
   placing a side band signal or digital tag or watermark signal to each piece of content;
   transmitting programming without any modification to said digital tags;
   collecting said digital tags;
   reporting said digital tags to a third party verification Internet collection point where it can be monitored by interested parties.

3. A system for capturing and/or verifying convergence traffic driven to a web via non-web technologies comprising;
   a device for placing a side band signal or digital tag or watermark signal to each piece of content;
   a transmitting source, which also has a collective device for collecting said digital tags;
   said transmitting source transmitting programming without any modification to said digital tag;
   said digital tags are collected and reported to a third party verification Internet collection point.

* * * * *